Jan. 29, 1952 W. G. DWINELL ET AL 2,583,824
SHADED SCREEN
Filed March 4, 1950 2 SHEETS—SHEET 1
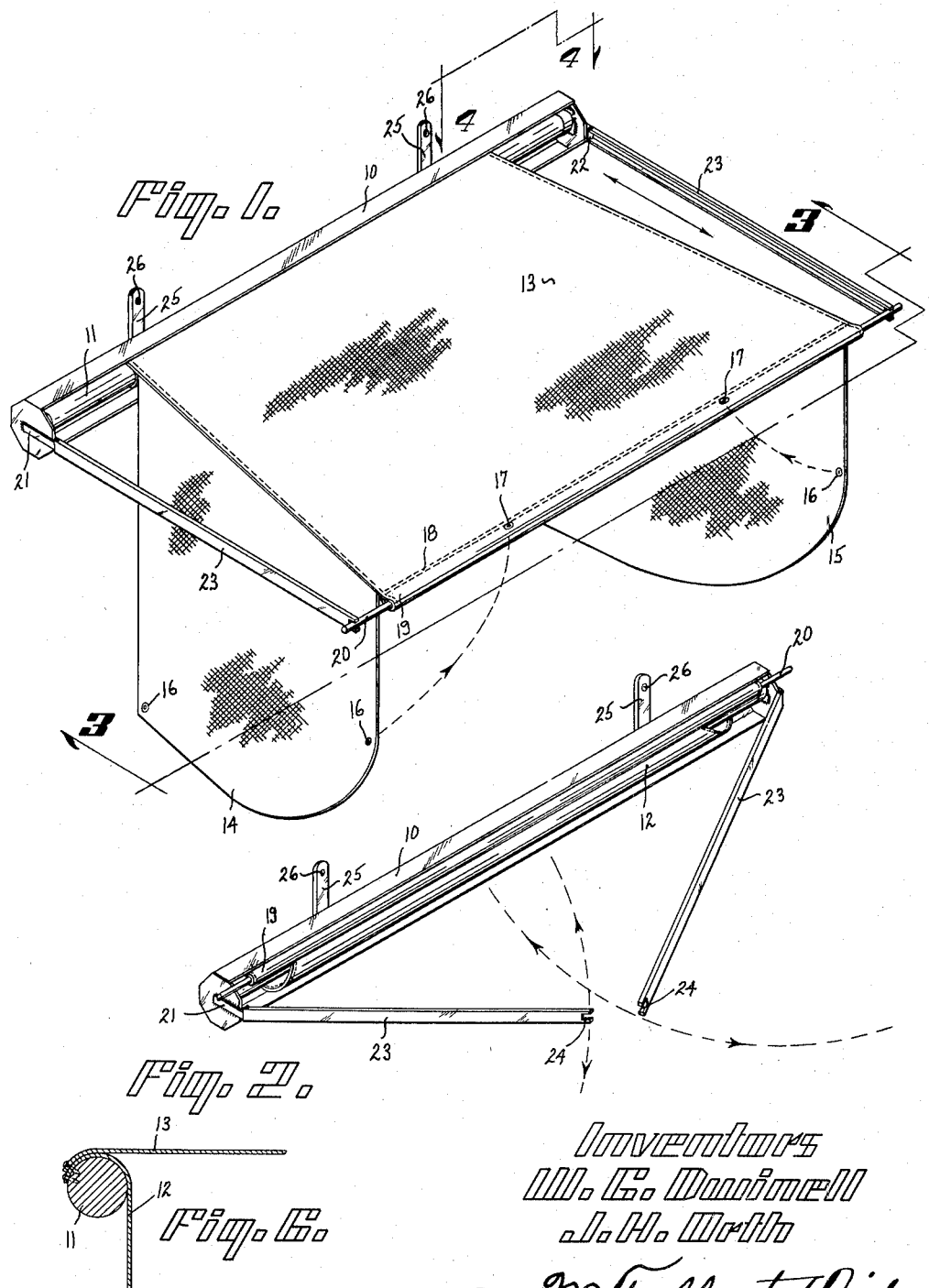
Inventors
W. G. Dwinell
J. H. Orth
by M. Talbert Dick
Attorney
Witness
Merle A. Bjork Jan. 29, 1952 W. G. DWINELL ET AL 2,583,824
SHADED SCREEN
Filed March 4, 1950 2 SHEETS—SHEET 2
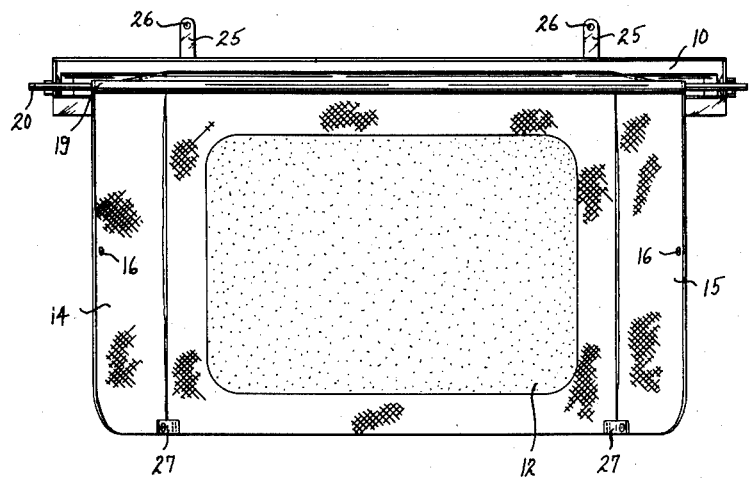
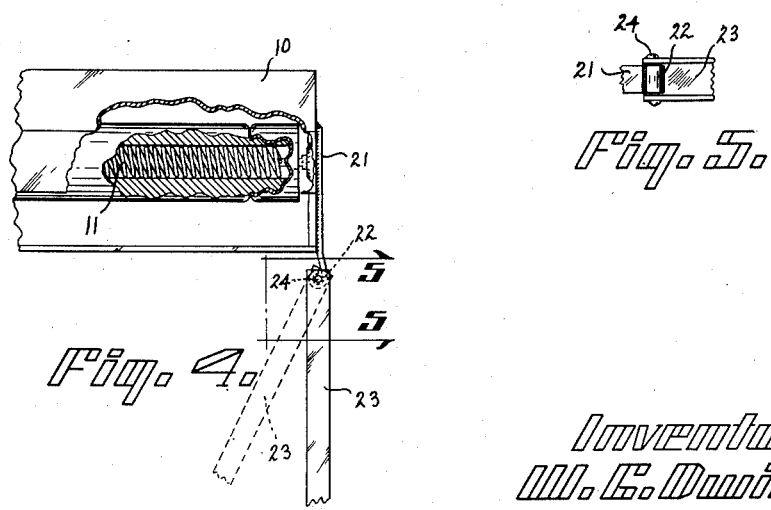

Patented Jan. 29, 1952

2,583,824

UNITED STATES PATENT OFFICE 2,583,824

SHADED SCREEN

William G. Dwinell, Indianapolis, Ind., and John Howard Orth, Ames, Iowa

Application March 4, 1950, Serial No. 147,738

6 Claims. (Cl. 160—20)

Our invention relates to a shaded screen that is designed to clearly reflect a projected image without having to darken the room or surroundings in which the screen and projector are placed.

The principal object of this invention is to provide with an image screen of the type mounted on a spring loaded shaft roller and arranged within an elongated housing, a light impervious curtain that is also mounted on the same roller with the image screen and which curtain in its operable position is designed to have a top horizontal portion and two side flap portions to box in the image screen on three sides and thereby prevent any direct light other than from the projector from reaching the screen.

A further object of this invention is to provide a shaded screen of the above class that is made into a single compact unit capable of being stored within the screen housing when not in use or for transporting.

A still further object of our invention is to provide a shaded screen as above described wherein the withdrawal of the light impervious curtain automatically withdraws the image screen which drops into vertical position due to gravity and the curtain can be easily and quickly secured in its operable position to supporting bracket arms mounted on the housing.

Still another object of this invention is to provide a screen as we have characterized that is economical in manufacture, durable in use, light in weight and easy to transport or store.

These and other objects will be apparent to those skilled in the art.

Our invention consists in the construction, arrangement, and combination of the various parts of the device, whereby the objects contemplated are attained as hereinafter more fully set forth, pointed out in our claims, and illustrated in the accompanying drawings, in which:

Fig. 1 is a perspective view of our light impervious curtain extended from an image screen housing and ready for use, Fig. 2 is a perspective view of this shaded screen in closed position within the housing and showing the supporting arms for the curtain in partially open position, Fig. 3 is a front view of this device taken from the line 3—3 of Fig. 1, Fig. 4 is a fragmentary top view of one end of the housing and one bracket support arm taken from the line 4—4 of Fig. 1 and showing a portion of the housing cut away to more fully illustrate the spring loaded shaft roller therein, Fig. 5 is a side view of the pivot connection joining one bracket support arm to the housing taken from the line 5—5 of Fig. 4, and Fig. 6 is a cross-sectional view of the roller of Fig. 1 showing the image screen and upper portion of the light impervious curtain shield secured to the same roller.

There are different type shaded screens on the market that are used when projecting slides or motion pictures in rooms or surroundings that are not darkened. However, the operation of the image screen and curtain shields are usually independent of each other and require more than one roller. Our invention embodies the use of only a single roller for both the screen and shield and not only simplifies the construction of this device but provides a more compact unit for transporting or storage.

Referring now to the drawings we have used the numeral 10 to designate an elongated housing having a slit opening extending along its longitudinal axis between its ends. Rotatably mounted within the housing is a spring loaded shaft roller 11 that continuously provides tension in one direction. A flexible image curtain or screen 12 is secured along its rear edge to the roller 11 in any suitable manner as shown in Fig. 6 and is designed to be rolled thereon when not in use, as shown in Fig. 2. The numeral 13 designates the top of a flexible curtain shield that is impervious to light and which has the two flexible side flap portions 14 and 15 as illustrated in Figs. 1 and 3. Each of the flaps 14 and 15 has suitably placed snaps 16 so that they can be folded flat against the top 13 and secured to the snaps 17 thereon. As shown in Fig. 1 the snap 16 at the lower left of the flap 14 and the corresponding snap on the flap 15 will fasten to a snap approximately at the rear center underside of the top 13 which is not shown. The top 13 of the light impervious curtain is secured along its rear edge to the roller 11 in a like manner as the screen 12 and above the screen as shown in Fig. 6. Obviously, when this device is closed, the flaps 14 and 15 will be snapped to the top 13 so that it will easily roll up on the shaft roller.

The forward free edge of the top 13 is turned back upon itself and secured in any suitable manner such as by the stitching 18 to provide the elongated loop passageway 19 in which there is placed a stop rod 20 that extends outwardly from each end of the passageway 19 as shown in Fig. 1.

On each end of the housing 10 there is secured a bar bracket 21. These each extend slightly forwardly of the housing opposite the slit opening and the forward end of each bracket is curved back upon itself to provide the eye 22. The numeral 23 designates a pair of elongated support arms that are each channel shaped in cross-section. Each arm 23 respectively is pivotally secured at one end to one of the eyes 22 by means of a pin 24 as shown in Fig. 5. The other end of each arm is provided with a U-shaped slot 24. Thus mounted the arms 23 are capable of being folded against the housing or extended as shown in Fig. 1. Because of the channel construction on the arms they will extend only to a point that is substantially at right angles to the housing due to the fact that at this point the brackets 21 will engage the channel side of the arms and thus serve as a stop means against further outwardly swinging of the arms as shown in Fig. 4. In construction, one arm 23 is slightly smaller in cross-section than the other so that in closed position when they are folded inwardly against the housing, the end portion of the larger arm will frictionally embrace the end portion of the smaller arm and thereby serve to hold the arms in closed position when this device is being transported or stored.

A pair of spaced apart support brackets 25 are secured to the back of the housing 10 and each bracket has an opening 26 so that this screen can be suspended from wall hooks at times.

Thus constructed and arranged our shaded screen will operate as follows. Normally, the spring loaded roller 11 will keep the screen 12 and light impervious curtain wound up within the housing 10 as shown in Fig. 2. In this position the end portions of the stop rod 20 will engage the edges of each end of the housing to prevent the curtain shield from becoming completely encased within the housing. The housing can be suspended from hooks on a wall or the like by means of the brackets 25. The support arms 23 are then opened to the position shown in Fig. 1 and the top 13 of the curtain shield is manually pulled outwardly to a point where each end of the stop rod 20 can be inserted in one of the slots 24 on the end of each arm 23. In this position because of the tension of the spring loaded roller and its tendency to return the curtain to its rolled up position, the curtain shield will obviously be held taut. It is pointed out that as the curtain shield is manually pulled outwardly, the image curtain screen 11 will automatically be withdrawn, since it is secured to the same roller as the shield, and it will drop by gravity to its operable position shown in Fig. 3. The side flaps 14 and 15 are then unsnapped so they will hang downwardly whereby the image screen will be boxed in on three sides by the curtain shield. On each end at the bottom of the image screen a snap 27 is provided which can be fastened to the snaps 16 on the sides 14 and 15 when this screen is in operable position to hold the sides closely adjacent the ends of the image curtain for the purpose of restricting the passage of light onto the screen.

To return the screen and shield to closed position it is only necessary to snap the side flaps of the shield to the top portion thereof and manually withdraw the stop rod from the slots in the supporting arms. The tension on the roller will then return both the screen and the shield to the position shown in Fig. 2. The arms can then be folded against the housing as previously described.

Some changes may be made in the construction and arrangement of our shadow screen without departing from the real spirit and purpose of our invention, and it is our intention to cover by our claims, any modified forms of structure or use of mechanical equivalents which may be reasonably included within their scope.

We claim:

1. In a device of the class described, an elongated housing having a longitudinal slit opening, a spring loaded shaft roller rotatably mounted inside said housing, a flexible image curtain having one end secured to said roller shaft and its free end extendable through said slit opening of said housing at times, a light impervious curtain secured at one end to said shaft roller above said image curtain and having its free end extendable through said slit opening at times, an elongated stop rod secured to said light impervious curtain adjacent its free end with each end portion of said rod extending outwardly from the sides of said impervious curtain, a pair of elongated support arms pivotally secured respectively by an end to the ends of said housing and each of said arms having a slot on its other end; said arms capable of being moved outwardly from said housing to a point where the end portions respectively of said stop rod can be engaged in one of the slots on said arms and thereby support said light impervious curtain in extended position from said housing, and a light impervious curtain at each of the two marginal edges of said second mentioned curtain extending downwardly therefrom when in effective position.

2. In a device of the class described, an elongated housing having a longitudinal slit opening, a spring loaded shaft roller rotatably mounted inside said housing, a flexible image curtain having one end secured to said roller shaft and its free end extendable through said slit opening of said housing at times, a light impervious curtain secured at one end to said shaft roller above said image curtain and having its free end extendable through said slit opening at times; each of said curtains simultaneously extendable so that when said curtains are extended through said opening, said first mentioned curtain will automatically drop to its effective position due to gravity, an elongated stop rod secured to said light impervious curtain adjacent its free end with each end portion of said rod extending outwardly from the sides of said impervious curtain, a pair of elongated support arms pivotally secured respectively by an end to the ends of said housing and each of said arms having a slot on its other end; said arms capable of being moved outwardly from said housing to a point where the end portions respectively of said stop rod can be engaged in one of the slots on said arms and thereby support said light impervious curtain in extended position from said housing, and a light impervious curtain at each of the two marginal edges of said second mentioned curtain extending downwardly therefrom when in effective position, and said third mentioned curtains capable of being folded flat against said second mentioned curtain and detachably secured thereto at times.

3. In a device of the class described, an elongated housing having a longitudinal slit opening, a spring loaded shaft roller rotatably mounted inside said housing, a flexible image curtain having one end secured to said roller shaft and its free end extendable through said slit opening of said housing at times, a light impervious curtain secured at one end to said shaft roller above said image curtain and having its free end extendable through said slit opening at times; each of said curtains simultaneously extendable so that when said curtains are extended through said opening, said first mentioned curtain will automatically drop to its effective position due to gravity, means for holding said last mentioned curtain at a substantially horizontal position at times, and a light impervious curtain at each of the two marginal edges of said second mentioned curtain extending downwardly therefrom when in effective position.

4. In a device of the class described, an elongated housing having a longitudinal slit opening, a spring loaded shaft roller rotatably mounted inside said housing, a flexible image curtain having one end secured to said roller shaft and its free and extendable through said slit opening of said housing at times, a light impervious curtain secured at one end to said shaft roller above said image curtain and having its free end extendable through said slit opening at times, an elongated stop rod secured to said light impervious curtain adjacent its free end with each end portion of said rod extending outwardly from the sides of said impervious curtain, a pair of elongated support arms pivotally secured respectively by an end to the ends of said housing and each of said arms having a slot on its other end; said arms capable of being moved longitudinally adjacent said housing at times and having means to prevent their accidental outwardly movement therefrom; said arms further capable of being manually moved outwardly from said housing to a point where the end portions respectively of said stop rod can be engaged in one of the slots on said arms and thereby support said light impervious curtain in extended position from said housing, stop means on said housing to limit the outwardly movement therefrom of said arms, and a light impervious curtain at each of the two marginal edges of said second mentioned curtain extending downwardly therefrom when in effective position.

5. In a device of the class described, an elongated housing having a longitudinal slit opening, a spring loaded shaft roller rotatably mounted inside said housing, a flexible image curtain having one end secured to said roller shaft and its free end extendable through said slit opening of said housing at times, a light impervious curtain secured at one end to said shaft roller above said image curtain and having its free end extendable through said slit opening at times; each of said curtains simultaneously extendable so that when said curtains are extended through said opening, said first mentioned curtain will automatically drop to its effective position due to gravity and when said second mentioned curtain is retracted back into said housing said first mentioned curtain will simultaneously automatically be returned therein, and a light impervious curtain at each of the two marginal edges of said second mentioned curtain extending downwardly therefrom when in effective position, and said third mentioned curtains capable of being folded flat against said second mentioned curtain and detachably secured thereto at times and when so secured capable of being wound upon said shaft roller with said first and second mentioned curtains.

6. In a device of the class described, an elongated housing having a slit opening, a spring loaded shaft roller rotatably mounted inside said housing, a flexible image curtain having one end secured to said roller shaft and its free end extendable through said slit opening of said housing at times, a light impervious curtain secured to said shaft roller at one end and having its free end extendable through said slit opening at times, a means for holding said last mentioned curtain at a substantially horizontal position at times, and a light impervious curtain at each of the two marginal edges of second mentioned curtain extending downwardly therefrom when in effective positions.

WILLIAM G. DWINELL.
JOHN HOWARD ORTH.

REFERENCES CITED

The following references are of record in the file of this patent:

UNITED STATES PATENTS

| Number | Name | Date |
|---|---|---|
| 253,568 | Willie | Feb. 14, 1882 |
| 2,029,675 | Schlamp | Feb. 4, 1936 |
| 2,112,579 | Schane | Mar. 29, 1938 |